(12) United States Patent
Grehn et al.

(10) Patent No.: US 6,400,136 B1
(45) Date of Patent: Jun. 4, 2002

(54) DEVICE FOR MEASURING ROTATIONAL SPEED OR DIRECTION ON ROLLING-CONTACT BEARINGS

(76) Inventors: Martin Grehn, Am Grafkreuz 5, D-97456 Dittelbrunn; Henri van der Knokke, Gutenbergstabe 7, D-97464 Niederwerrn, both of (DE)

( * ) Notice: Subject to any disclaimer, the term of this patent is extended or adjusted under 35 U.S.C. 154(b) by 0 days.

(21) Appl. No.: 09/204,389

(22) Filed: Dec. 2, 1998

(30) Foreign Application Priority Data

Dec. 3, 1997 (DE) .......................................... 197 53 583

(51) Int. Cl.$^7$ ................................................. G01P 3/44
(52) U.S. Cl. .................... 324/174; 324/207.25; 384/448
(58) Field of Search ............................ 324/207.25, 173, 324/174, 163, 160, 166, 207.16; 384/448

(56) References Cited

U.S. PATENT DOCUMENTS

| | | | | |
|---|---|---|---|---|
| 5,018,393 A | * | 5/1991 | Seegers .................... | 73/862.34 |
| 5,736,853 A | * | 4/1998 | Rigaux ....................... | 324/173 |
| 5,986,448 A | * | 11/1999 | Yada et al. .................. | 324/173 |
| 6,113,276 A | * | 9/2000 | Bourgeois-Jacquet ....... | 384/448 |

* cited by examiner

*Primary Examiner*—Jay Patidar
(74) *Attorney, Agent, or Firm*—Ostrolenk, Faber, Gerb & Soffen, LLP

(57) ABSTRACT

A device for measuring rotation speed or rotation direction of a rolling-contact bearing which is attached to the bearing. The bearing has an inner and an outer bearing ring with a row of bearing rolling elements between them. A respective sensor unit is at each axial end of the bearing rings. Each sensor unit includes a pulse transmitter ring on one of the inner and outer bearing rings and a sensor on the other of the bearing rings, and the sensor units operate independently. Each sensor unit is force-fit or positively connected to one of the bearing rings, with the pulse transmitter ring connected to one of the bearing rings and the sensor to the other bearing ring.

8 Claims, 1 Drawing Sheet

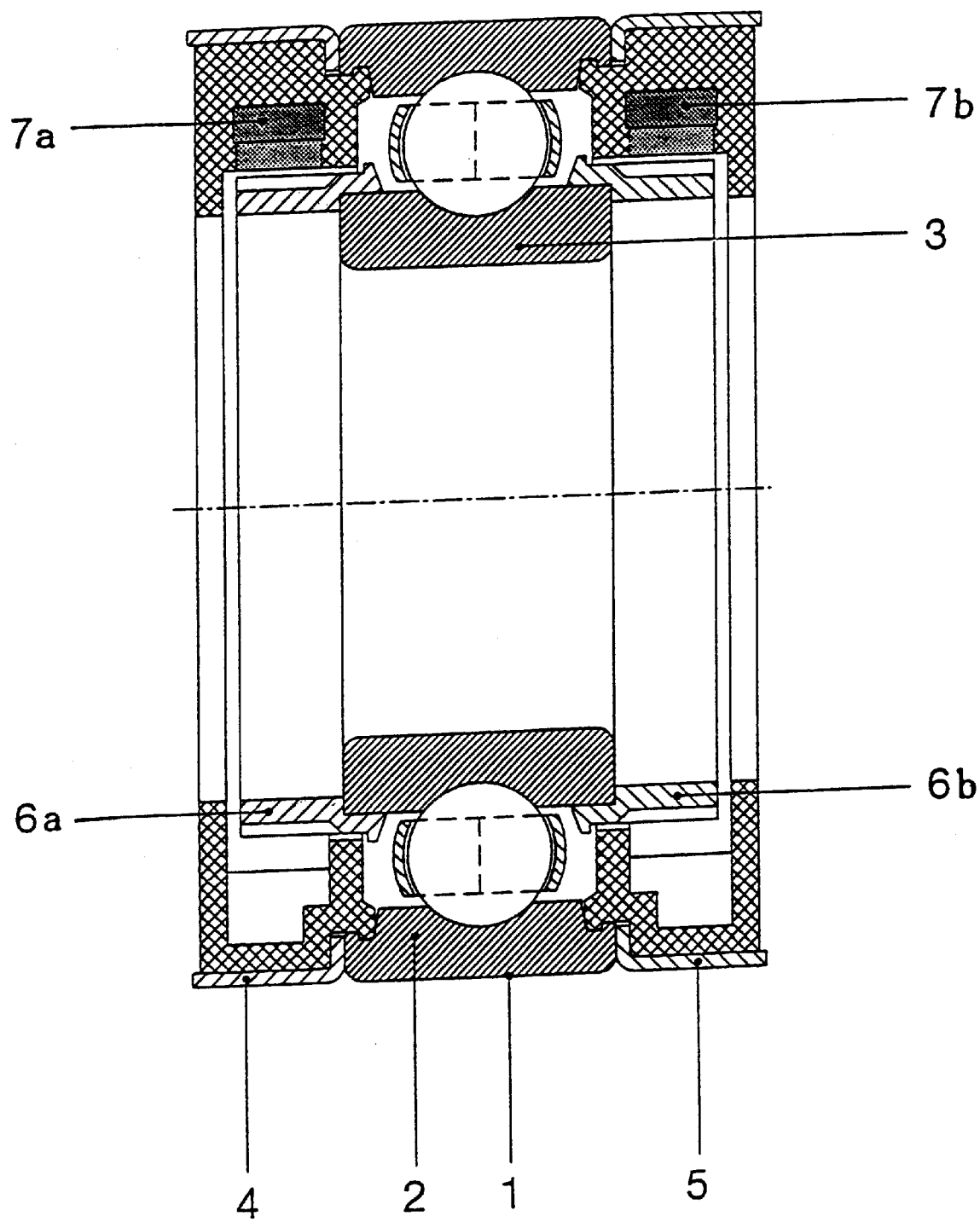

DEVICE FOR MEASURING ROTATIONAL SPEED OR DIRECTION ON ROLLING-CONTACT BEARINGS

BACKGROUND OF THE INVENTION

The present invention relates to a device for measuring rotational speed and/or direction of a rolling-contact bearing.

Devices for measuring rotational speed on rolling-contact bearings are already known. Thus, a deep-groove ball bearing with an integrated sensor is shown in the FAG brochure Part No. WL 43-1206 D 97/3/97. With that sensor, it is intended to register the respective rotational speed and direction of rotation and to generate corresponding signals. In the event of failure of the sensor unit or of one of its components, the measurement is not possible or is erroneous. Thus, this apparatus cannot be used in safety-relevant applications. German Patent 195 10 717 proposes using two sensors. Here, however, these are installed in two different bearings. This is a complicated solution, as it requires two bearings. Furthermore, the design possibilities are restricted by the larger space requirement. In addition, the non-fixed connection of the two sensor bearings may cause signal differences and misinterpretations to arise.

SUMMARY OF THE INVENTION

It is an object of the present invention to provide a device without these disadvantages and, which in particular, provides an operationally reliable, compact but nonetheless simple sensor mounting.

The invention concerns a device for measuring rotation speed or rotation direction of a rolling-contact bearing which is attached to the bearing. The bearing has an inner and an outer bearing ring with a row of bearing rolling elements between them. A respective sensor unit is at each axial end of the bearing rings. Each sensor unit includes a pulse transmitter ring on one of the inner and outer bearing rings and a sensor on the other of the bearing rings. The sensor units operate independently. Each sensor unit is force-fit or positively connected to one of the bearing rings, with the pulse transmitter ring connected to one of the rings and the sensor to the other ring. Fastening two sensor units, each comprised of a pulse transmitter and a sensor, to the ends of one bearing produces a compact unit which is also cost-effective. The design freedom provided by the redundant sensor unit is considerably greater. The desired double measurement is very reliable, since signal differences and misinterpretations are forestalled by the fixed mechanical connection between the bearing and sensor parts.

BRIEF DESCRIPTION OF THE DRAWING

Other objects, features and advantages of the present invention will become apparent from the following description of the invention which refers to the accompanying drawing which shows a longitudinal section through a bearing incorporating the invention.

DETAILED DESCRIPTION OF THE INVENTION

The longitudinal section in the drawing shows two axially spaced apart sensor units 4 and 5 fastened at axially spaced apart locations and preferably to both axial ends of a normal annular ball bearing 1. The bearing is seated on a shaft (not shown). The shaft defines a single bearing inner raceway 3. The single bearing outer ring defines the bearing outer raceway 2. A single row of bearing balls rolls on the raceways. This bearing design provides a simple and compact sensor mounting, enabling operationally reliable determination of the rotational speed and/or direction of rotation of the inner ring with reference to the outer ring. This simplicity results because only the absolutely necessary number of individual parts is present, specifically a single normal ball bearing 1 and the two sensor units.

Each sensor unit comprises an identical pulse transmitter ring 6 and a respective sensor 7 on a respective axial side of the bearing 1.

Each pulse transmitter ring 6 is force-fitted or positively connected to the radially exterior side of the axial edge of the inner raceway 3. Each sensor 7 is positively connected into the outer raceway 2.

The locations of these elements on the inner and outer rings may be exchanged. This arrangement of parts produces one modular unit. The resultant good fastening thereby connects the two sensors to form one unit with the bearing and avoids interpretation errors resulting from signal differences.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A device for measuring the rotational speed and/or the direction of rotation of a rotatable shaft in a rolling-contact bearing, wherein the bearing comprises: a radially inner bearing ring and a radially outer bearing ring and rolling elements between the inner and outer rings for enabling their relative rotation, the bearing having an axial direction;

the device comprising:

a first sensor unit comprising a first pulse transmitter ring on one of the inner and the outer rings, a first sensor on the other of the inner and the outer rings for sensing the pulse transmitted from the first pulse transmitter ring; and a second sensor unit comprising a second pulse transmitter ring on one of the inner and outer rings and operating independently of the first sensor unit a second sensor for the second pulse transmitter ring on the other of the inner and the outer rings for sensing the pulse transmitted from the second pulse transmitter ring; and the first and second sensor units are axially spaced apart on the bearing.

2. The device of claim 1, wherein the bearing rings have opposite axial ends; and the first and second sensor units are respectively at the opposite ends of the bearing rings.

3. The device of claim 2, wherein each of the pulse transmitter rings is mounted to the inner bearing ring, and each of the sensors is mounted to the outer bearing ring.

4. The device of claim 2, wherein each of the pulse transmitter rings is force-fit or positively connected to one of the inner and outer bearing rings and each of the sensors is force-fitted or positively connected to the other of the inner and outer bearing rings.

5. The device of claim 4, wherein the bearing has a single one of the inner rings and a single one of the outer rings and the sensor units are on the axial opposite ends of the inner and the outer rings.

6. The device of claim 5, wherein each of the pulse transmitter rings is mounted to the inner bearing ring, and each of the sensors is mounted to the outer bearing ring.

7. The device of claim 5, wherein the bearing is a single rolling-contact bearing and the rolling elements are in a single row of rolling elements.

8. The device of claim 7, wherein each of the pulse transmitter rings is mounted to the inner bearing ring, and each of the sensors is mounted to the outer bearing ring.

* * * * *